(12) United States Patent
Ray et al.

(10) Patent No.: US 9,090,049 B2
(45) Date of Patent: Jul. 28, 2015

(54) METHOD OF MAKING COMPOSITE STONE PANELS

(71) Applicant: ForzaStone LLC, Mesa, AZ (US)

(72) Inventors: Curtis Ray, Mesa, AZ (US); Geoff Habicht, Baltimore, MD (US)

(73) Assignee: ForzaStone LLC, Tempe, AZ (US)

( * ) Notice: Subject to any disclaimer, the term of this patent is extended or adjusted under 35 U.S.C. 154(b) by 0 days.

(21) Appl. No.: 14/197,846

(22) Filed: Mar. 5, 2014

(65) Prior Publication Data

US 2014/0182777 A1 Jul. 3, 2014

Related U.S. Application Data

(63) Continuation of application No. 13/972,799, filed on Aug. 21, 2013.

(60) Provisional application No. 61/725,104, filed on Nov. 12, 2012.

(51) Int. Cl.
*B32B 37/14* (2006.01)
*E04C 2/28* (2006.01)
(Continued)

(52) U.S. Cl.
CPC . *B32B 37/14* (2013.01); *E04C 2/26* (2013.01); *E04C 2/28* (2013.01); *E04C 2/292* (2013.01); *E04C 2/365* (2013.01); *E04F 13/144* (2013.01);
(Continued)

(58) Field of Classification Search
CPC .......... E04C 2/26; E04C 2/292; E04C 2/365; E04F 13/147; E04F 13/144; B32B 37/14
USPC ........ 52/783.1, 783.11, 783.17, 789.1, 796.1, 52/309.15, 309.13; 264/145, 139, 158, 264/160; 125/16.02, 21
See application file for complete search history.

(56) References Cited

U.S. PATENT DOCUMENTS 1,909,001 A * 5/1933 Nelson ........................ 125/13.01
2,735,418 A * 2/1956 Loeffler ............................ 125/9
(Continued)

FOREIGN PATENT DOCUMENTS

WO WO 2009110870 A1 * 9/2009

OTHER PUBLICATIONS

Stone Panels, Inc.—Typical Panel Installation Video: https://www.youtube.com/watch?v=nTzzb76FN4E. Nov. 17, 2011.
(Continued)

*Primary Examiner* — Joshua J Michener
*Assistant Examiner* — Matthew Gitlin
(74) *Attorney, Agent, or Firm* — Booth Udall Fuller, PLC

(57) ABSTRACT

A composite stone panel can comprise a stone slab. A partially metallic panel backer is coupled to the stone slab and can further comprise a core material layer, a first interface layer disposed on a first surface of the core material layer, and a second interface layer disposed on a second surface of the core material layer opposite the first metal interface layer. The stone slab can further comprise a length greater than 1.2 meters (m), a width greater than 0.6 m, and a thickness in a range of 0.2-1.5 centimeters (cm). The core material layer can comprise a thickness greater than 3.75 millimeters and can further comprise polyethylene and optional fibers. The first and second interface layers can comprise a thickness of aluminum in a range of 0.21 millimeters (mm) to 0.30 mm. Accordingly, the composite stone panel can comprises a thickness in a range of 0.6-3.0 cm.

16 Claims, 5 Drawing Sheets

(51) Int. Cl.
*E04C 2/26* (2006.01)
*E04C 2/292* (2006.01)
*E04C 2/36* (2006.01)
*E04F 13/14* (2006.01)

(52) U.S. Cl.
CPC ......... *E04F 13/147* (2013.01); *Y10T 29/49629* (2015.01); *Y10T 156/1052* (2015.01); *Y10T 428/24149* (2015.01); *Y10T 428/24628* (2015.01); *Y10T 428/24967* (2015.01); *Y10T 428/24975* (2015.01); *Y10T 428/266* (2015.01)

(56) References Cited

U.S. PATENT DOCUMENTS

| | | | |
|---|---|---|---|
| 3,597,891 A | | 8/1971 | Martin |
| 3,723,233 A | * | 3/1973 | Bourke .................. 428/118 |
| 3,750,355 A | * | 8/1973 | Blum .................. 52/309.12 |
| 3,950,202 A | * | 4/1976 | Hodges .................. 156/154 |
| 3,963,846 A | * | 6/1976 | Bourke .................. 428/73 |
| 3,976,045 A | * | 8/1976 | Coggins, Jr. .................. 125/12 |
| 4,063,982 A | * | 12/1977 | Bourke .................. 156/254 |
| 4,973,506 A | | 11/1990 | Bauer et al. |
| 5,056,272 A | * | 10/1991 | Battaglia .................. 451/41 |
| 5,087,500 A | * | 2/1992 | Kasper et al. .................. 428/116 |
| 5,131,378 A | | 7/1992 | Marocco |
| 5,243,960 A | * | 9/1993 | Myles .................. 125/21 |
| 5,339,795 A | * | 8/1994 | Myles .................. 125/21 |
| 5,460,865 A | * | 10/1995 | Tsotsis .................. 428/116 |
| 5,605,141 A | * | 2/1997 | Bilotta .................. 125/16.02 |
| 5,670,007 A | | 9/1997 | Toncelli |
| 6,039,832 A | * | 3/2000 | McCarville .................. 156/292 |
| 6,257,225 B1 | * | 7/2001 | Harris .................. 125/13.01 |
| 6,698,149 B1 | | 3/2004 | Ruchgy |
| 6,818,275 B2 | | 11/2004 | Guarda et al. |
| 6,886,304 B1 | | 5/2005 | Godi et al. |
| 7,371,441 B2 | | 5/2008 | Sakai et al. |
| 7,504,159 B1 | * | 3/2009 | Suare et al. .................. 428/532 |
| 8,353,144 B2 | | 1/2013 | Bolin |
| 8,367,183 B2 | | 2/2013 | Take et al. |
| 2002/0174622 A1 | | 11/2002 | Ouellet et al. |
| 2003/0124269 A1 | | 7/2003 | Servi |
| 2006/0059854 A1 | * | 3/2006 | Lunardi .................. 52/745.19 |
| 2007/0044402 A1 | * | 3/2007 | Hess .................. 52/302.1 |
| 2007/0256379 A1 | | 11/2007 | Edwards |
| 2008/0155921 A1 | * | 7/2008 | Wolf et al. .................. 52/386 |
| 2008/0311339 A1 | | 12/2008 | Toncelli |
| 2009/0155593 A1 | | 6/2009 | O'Brian |
| 2010/0009159 A1 | | 1/2010 | Kimberly |
| 2011/0005695 A1 | * | 1/2011 | Boone et al. .................. 160/377 |
| 2011/0262701 A1 | | 10/2011 | Albertelli |
| 2012/0021169 A1 | | 1/2012 | Take et al. |
| 2012/0168991 A1 | * | 7/2012 | Sadler .................. 264/426 |
| 2012/0318450 A1 | | 12/2012 | Santo Sanchez et al. |
| 2013/0149484 A1 | * | 6/2013 | Moore et al. .................. 428/67 |
| 2014/0130438 A1 | * | 5/2014 | Durst et al. .................. 52/638 |
| 2014/0190464 A1 | * | 7/2014 | Hartwell .................. 125/12 |

OTHER PUBLICATIONS

ForzaStone Product Video: https://www.youtube.com/watch?v=QGJLPDmrFwg. Mar. 22, 2011.
FauxPanels video on WE: https://www.youtube.com/watch?v=2EDJazkS9jk. Dec. 17, 2007.

* cited by examiner

METHOD OF MAKING COMPOSITE STONE PANELS

RELATED APPLICATIONS

This application is a continuation application of U.S. patent application Ser. No. 13/972,799, titled "Composite Stone Panels," filed Aug. 21, 2013, which application claims the benefit of U.S. Provisional Application No. 61/725,104, filed Nov. 12, 2012, the disclosures of which are hereby incorporated by this reference.

TECHNICAL FIELD

The present disclosure relate to the field of building materials including decorative stone finishes for interior and exterior uses.

BACKGROUND

Stone is a popular building material that is often used for its structural and aesthetic qualities. When selecting pieces of stone for use in building applications, a thickness of stone is selected to ensure structural integrity and prevent cracking and breaking of the stone. However, in many applications a thickness of the stone pieces selected for panels, slabs, or tiles was large enough that the stone was expensive, heavy, difficult to transport and install, and limited the overall dimensions or size of the stone pieces.

More recently, thicknesses of stone pieces has been reduced in an effort to reduce material, cost, and weight. In some instances, additional materials have been placed on a surface of the stone to increase strength and compensate for the reduction in stone thickness. For example, granite countertops sometimes include a fiberglass mesh that is applied to an underside or unexposed surface of the countertop to increase tensile strength and reduce bowing. Additionally, in applications using stone that is particularly susceptible to warping, such as Carrara Marble, more robust reinforcement has been used to reduce the undesirable warping and bowing that causes fissures or cracks to form in a surface of the stone. More robust reinforcement for stone has included a metal backer that includes an aluminum honeycomb sandwiched between two aluminum plates. Similarly, some tile applications, such as small ceramic tiles (with dimensions of approximately 12×12 inches (in.) to approximately 18×18 in.) have added a porcelain backer increase tile strength.

Known reinforcement methods have not allowed for stone panels with thickness less than 10 millimeters (mm) to have areas over 2,440 mm (or 8 feet (ft.))×1,220 mm (or 4 ft.).

SUMMARY

A need exists for lighter, less expensive, more robust stone building material that can be used for interior or exterior portions of buildings. Accordingly, a composite stone panel can comprise a stone slab. A partially metallic panel backer can be coupled to the stone slab, the partially metallic panel backer further comprising a core material layer, a first interface layer disposed on a first surface of the core material layer, and a second interface layer disposed on a second surface of the core material layer opposite the first metal interface layer. The composite stone panel can further comprise the stone slab comprising a length greater than 1.2 meters (m), a width greater than 0.6 m, and the composite stone panel comprising a thickness in a range of 0.6-3.0 centimeters (cm). The core material layer can comprises a thickness greater than 3.75 millimeters and further comprise polyethylene with optional fibers. The first and second interface layers can comprise a metal. The first and second interface layers can comprise a thickness of aluminum or aluminum alloy in a range of 0.21-0.30 mm. The first and second interface layers can comprise a coefficient of thermal expansion in a range of 20-30, and the core material layer can comprise a coefficient of thermal expansion in a range of 20-200. The first interface layer and second interface layer can comprise dimples that increase the surface area of the metal backer by a factor of about two. The partially metallic panel backer can further comprise a honeycomb metallic core and fiberglass first and second interface layers.

In another aspect, a composite stone panel can comprise a stone slab comprising a length greater than 1.2 m, a width greater than 0.6 m, and a thickness in a range of 0.2-1.5 cm. A panel backer can be coupled to the stone slab, the panel backer further comprising a core material layer, a first interface layer disposed on a first surface of the core material layer, and a second interface layer disposed on a second surface of the core material layer opposite the first metal interface layer.

The composite stone panel can further comprise a thickness in a range of 0.6-3.0 cm. The core material layer can comprise a thickness greater than 3.75 millimeters and further comprise polyethylene. The first and second interface layers can comprise a metal comprising a thickness in a range of 0.21-0.30 mm. The metal first or second interface layer can comprise dimples. The partially metallic panel backer can be coupled to the stone slab with a thickness of epoxy adhesive in a range of 0.2-1.5 mm. The partially metallic panel backer can further comprise a honeycomb metallic core and fiberglass first and second interface layers.

In yet another aspect, a method of making a composite stone panel can comprise cutting a stone slab to comprise a length greater than 1.2 m, a width greater than 0.6 m, and a thickness in a range of 0.2-1.5 cm. The method can further comprise attaching first and second panel backers to first and second opposing surface of the stone slab, and cutting the stone slab between the first and second panel backers to form first and second composite stone panels.

The method of making the composite stone panel can further comprise forming the first and second panel backers comprising a core material layer and first and second interface layers disposed on first and second opposing surfaces of the core material layer. The method can further comprise forming the core material layer comprising a thickness greater than 3.75 mm and further comprising polyethylene with optional fibers; and forming the first and second interface layers comprising a thickness of aluminum in a range of 0.21-0.30 mm. The method can further comprise forming dimples in a surface of the first or second panel backers. The method can further comprise forming the first and second interface layers comprising a coefficient of thermal expansion in a range of 20-30, and forming the core material layer comprising a coefficient of thermal expansion in a range of 20-200.

DETAILED DESCRIPTION

Embodiments in the disclosure present devices, methods, and systems to improve the application of stone as a decorative finish using large composite stone panels. In the following description, numerous specific details are set forth, such as specific configurations, sizes, compositions, and processes, in order to provide a thorough understanding of the disclosure. In other instances, well-known aspects have not been described in particular detail in order to not unnecessarily obscure the disclosure. Furthermore, it is to be understood that the various embodiments shown in the FIGs. are illustrative representations and are not necessarily drawn to scale. Similarly, the proportions and relative sizes of various layers illustrated in the FIGs. are also not to scale and can vary according to different embodiments.

The terms "over," "under," and "between," as used herein, refer to relative positions of one feature with respect to other features. One feature deposited or disposed above, below, over, or under another feature may be directly in contact with the other feature or may have one or more intervening features. One feature deposited or disposed between features may be directly in contact with the features or may have one or more intervening features. A first feature "on" a second feature may be directly in contact with the second feature or may have one or more intervening features.

Figure 1A:
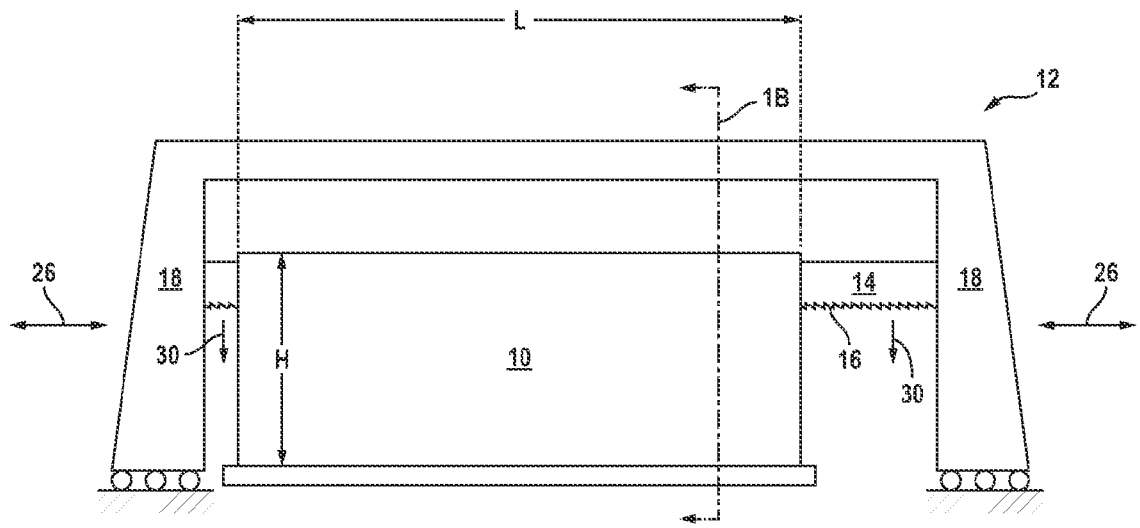
FIGS. 1A-1B illustrate front and side cross-sectional views of stone slabs being cut from a stone block.
Figure 1B:
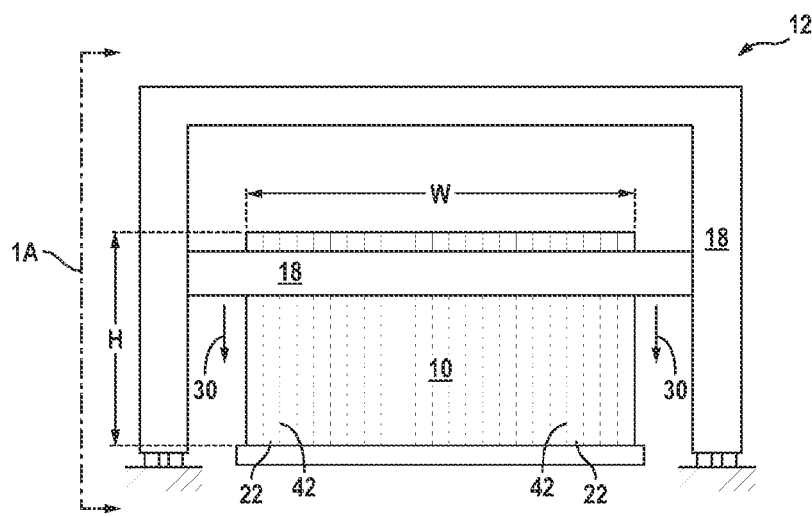

FIGS. 1A and 1B show elevational cross sectional views of a stone block 10 being cut by a stone-cutting saw, gang saw, or block cutters 12. FIG. 1A shows a cross-sectional view taken transverse, or perpendicular, to width W of stone block 10 (as shown by section line 1A in FIG. 1B). Similarly, FIG. 1B shows a cross-sectional view taken transverse, or perpendicular, to length L of stone block 10, (as shown by section line 1B in FIG. 1A), such that FIGS. 1A and 1B show views that are perpendicular or rotated 90 degrees with respect to each other.

Stone block 10 can include any stone that is desirable for construction applications including igneous, metamorphic, and sedimentary stones such as marble, granite, travertine, or any other stone. Stone block 10 can include a height (H) in a range of approximately 0.6-1.8 m (or 2-6 feet), a length (L) in a range of approximately 1.2-3.7 m (or 4-12 feet), and a width (W) in a range of approximately 5-150 cm (or 2-60 inches (in.) or more) to produce stone slabs with a lesser thickness and a greater area than was previously possible and practical in the art.

Stone cutting saw 12 can include one or more saw blades 14 and a blade driving element or frame 18. By employing a plurality of saw blades 14 attached to frame 18, block 10 can be simultaneously cut into a number of stone slabs or panels 22. Saw blades 14 can include a cutting edge or serrations 16 formed along an edge of the saw blades. Saw blades 14 can be made of one or more materials, such as metal with an abrasive cutting edge or diamond tipped serrations. Saw blades 14 can include first and second opposing ends attached to opposing points of frame 18. For example, in an embodiment, frame 18 comprises a u-shaped portion that alternately moves in opposing directions along a fixed line such that saw blades 14 can be drawn back and forth across block 10 with cutting edge 16 in contact with block 10 to cut or remove material from the block.

As shown in FIG. 1B, one or more stone slabs or panels 22 can be cut from stone block 10 as saw blades 14 are moved back and forth across stone block 10 in a direction 26 (see FIG. 1A) that is substantially parallel with a length L of block 10 and perpendicular to a width W of block 10. Additionally, as saw blades 14 remove material from block 10, saw blades 14 can also move in a direction 30 that extends through height H of stone block 10 to form stone slabs 22. Saw blades 14 provide planar cuts along projected cutting lines or segmentation lines 42 to form stone slabs 22.

Stone slab 22 can be cut from stone block 10 after receiving shipment of the stone block from a quarry. Exposed or sawn surfaces of stone slabs 22 can be rough and non-planar after cutting. In an embodiment, stone slabs 22 comprise a thickness greater than or equal to about 1.7 cm, which allows for processing and the formation of composite stone panels as described below. In applications in which smoother, more planar exposed surfaces are desired, stone slabs 22 can be further planarized and smoothed, thereby forming stone slabs 22 with a substantially uniform thickness. Exposed surfaces of stone slab 22 can be planarized by grinding, polishing, or other suitable process or combination of processes. In an embodiment, stone slabs 22 can be placed in a gauging machine to planarize the exposed surfaces. Different tolerances for a thickness and surface planarity of stone slabs 22 can be set depending on the final application or end use of the stone slab.

Figure 2:
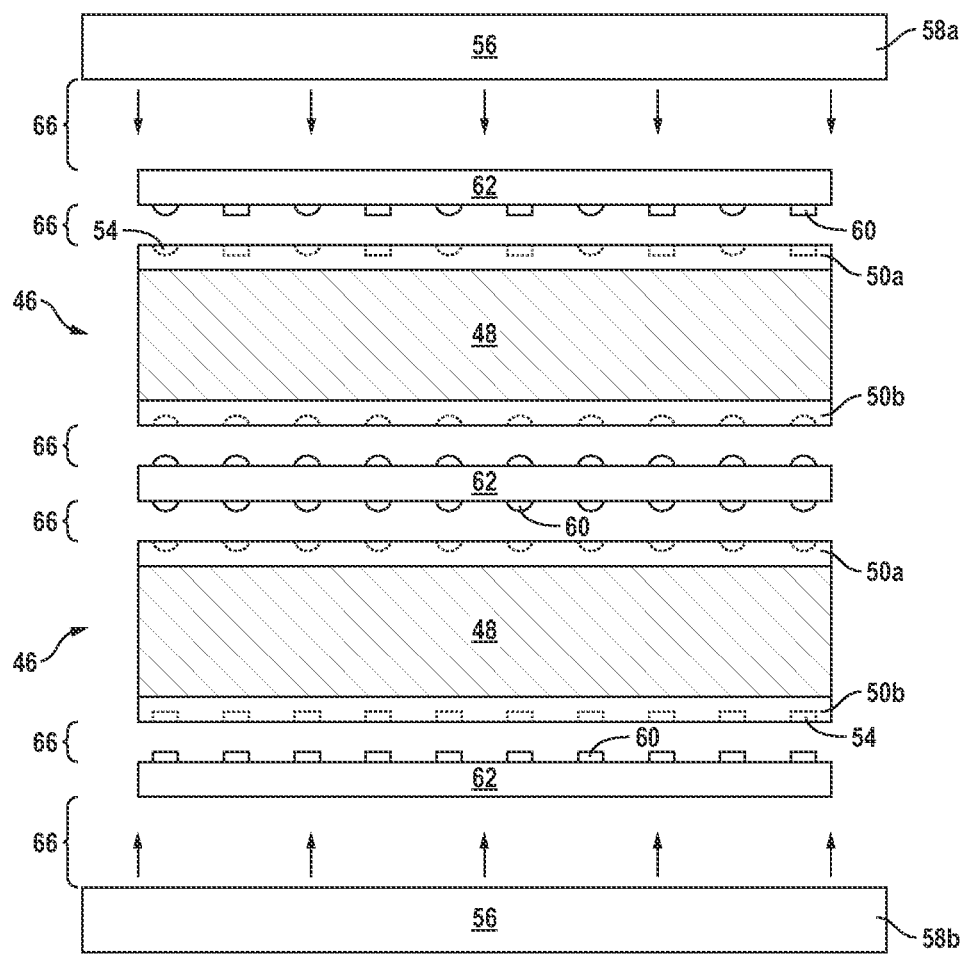
FIG. 2 illustrates a plurality of panel backers and dimpling slipsheets disposed within a press.

FIG. 2 shows an elevational cross sectional view of portions of a plurality of panel backers 46, which are a structural elements that can be attached to stone slabs 22 to provide additional structural support. Panel backers 46 can be composite panels comprising one or more layers that, taken together, form a thicker structural support than what has been conventionally used in art. In an embodiment, panel backers 46 can comprise three layers, a non-metallic core material layer 48 disposed between first and second metallic interface layers 50a and 50b. In an embodiment, panel backers 46 can be purchased as integral, pre-formed panels. Panels comprising a non-metallic core layer and opposing metallic interface layers can be available for purchase as panels that are sold for use as exterior finishes for structures such as commercial buildings used for office or retail space. For example, Feiteng Aluminum Composite Panel Co., Ltd and Multipaneluk, Ltd are examples of companies that currently provide composite aluminum panels. However, such panels for use as exterior surface finishes typically include a thickness in a range of about 2.0-3.0 mm (or 80-120 mils) when used as building wraps, which is less than a thickness used for composite stone panels having an size as described above with respect to FIGS. 1A and 1B.

Core material layer 48 can be a non-metallic core material such as plastic, fiberglass, resin, polymer, or other suitable material comprising an optional fibrous material embedded within the core material such as fibers, strands, woven material, or other material in other suitable forms. In an embodiment, core material layer 48 can be low density polyethylene (PE) with optional fiber material comprising a minimum thickness in a range of about 3.75 mm-6.00 mm. A minimum thickness of about 4 mm of PE for core material layer 48 is desirable because in applications where a thickness of about 3 mm of PE was used the panel backers were prone to breaking, which in turn would crack the stone slabs to which the panel backers were attached. A coefficient of thermal expansion (CTE) for low density PE is approximately $200 \times 10^{-6}$ m/m K.

Alternatively, core material layer 48 can also be made using a high density PE, in which case a thickness of the high density PE can be similar, or equal, to a thickness of the low density PE. High density PE comprises a tensile strength similar to a tensile strength of low density PE and can include a tensile yield strength in a range of about 26-33 megapascals (MPa) and an ultimate tensile strength of about 37 MPa. However, high density PE can have a CTE in a range of about $20\text{-}100\times10^{-6}$ m/m K, and therefore undergoes less expansion and contraction per unit of temperature change than does low density PE. Accordingly, panel backers 46 made with high density PE can experience less bowing and warping than panel backers made using low density PE, and as such can be used for applications in which bowing would be especially problematic, such as in applications where the panels might be exposed to large changes in temperature. Use of high density PE as part of panel backers 46 can also be beneficial because high density PE is fire resistant and can decrease a spread of fire, thereby increasing safety and broadening a market for the product to include commercial buildings and locals with strict fire codes.

First interface layer 50a and second interface layers 50b are disposed on opposing sides of core material layer 48 to form a composite panel backer 46. In an embodiment, panel backer 46 is a partially metallic composite panel in which interface layers 50a and 50b are metallic and can be made of any suitable metal such as, without limitation, steel, iron, copper, aluminum, or alloys thereof. In a particular non-limiting embodiment, interface layers 50a and 50b comprise aluminum interface layers including a thickness in a range of about 0.21-0.30 mm (or about 8-12 mils). A similar range of thicknesses can be used for other types of metals. While greater thicknesses of metal can be used for interface layers 50a and 50b, increasing a thickness of metal interface layers 50a and 50b also increases a weight of panel backer 46, which can make the panel backer more difficult to move and install as well as increase a cost of material for the panel backer, each of which is undesirable. Aluminum interface layers 50a and 50b include a CTE of about 28, and can be oxidized, anodized, coated, or otherwise treated to increase durability and material life of the interface layers, especially for exterior or outdoor applications.

Use of panel backers comprising core material layer 48 sandwiched or interleaved between two opposing metal interface layers 50a and 50b provides a number of advantages. First, plastic core materials, such as PE, generally have very little tensile strength. By using higher tensile strength interface layers, such as metals, to attach to core material layer 48, an overall tensile strength of panel backer 46 increases, which in turn increases a strength of a composite stone panel as described in greater detail below. Using first and second interface layers 50a and 50b attached to opposing sides of core material layer 48 creates panels with greater strength than similar panels that use only a single interface layer. For example, a modified panel backer using only a single aluminum interface layer comprising a thickness in a range of approximately 0.2-0.3 mm coupled to a PE core layer comprising a thickness of approximately 6 mm was not suitable because the modified panel backers were prone to breaking, which would in turn crack the stone slabs to which they were attached. Thus, the use of two metal interface layers, such as interface layers 50a and 50b, drastically reduces a number of incidents of the stone cracking due to thermal cycling and CTE mismatches.

Additionally, the formation of panel backers 46 comprising deformable or malleable interface layers 50a and 50b, allows for the formation of dimples 54 by texturing, roughening, or dimpling of panel backers 46 or interface layers 50a and 50b. Dimples 54 can be discrete indentations shaped as hemispheres, squares, rectangles, blocks, polygons, prisms, or any other geometric or organic shape or combination of shapes formed in a pattern, grid, or array across one or more surfaces of panel backers 46. Alternatively, dimples can be a continuous texture or pattern comprising ridges, channels, troughs, hatching, or other suitable marking that increases a surface area of an exposed surface of panel backers 46, such as interface layers 50a and 50b. In either case, dimples 54 can extend across an entirety of one or more surfaces of panel backers 46; or alternatively, can extend across only a portion of the one or more surfaces that is less than an entirety.

The optional formation of dimples 54 can increase a surface area of the interface layers and improve subsequent bonding of surfaces of panel backers with adhesives and other materials or layers. As one non-limiting example, a surface area of one or more interface layers 50a or 50b can be approximately doubled. By increasing the surface area of the interface layers 50a or 50b, a greater quantity of adhesive can come in contact with the interface layers and form a stronger bond between the interface layers and other materials mounted to the interface layers. Materials mounted to the interface layers can include, without limitation, subsequently mounted stone slabs or a surface to which a completed composite stone panel will be mounted. Increasing a surface area of interface layers 50a and 50b by creating dimples 54 is a cost effective and time effective way for increasing a bonding surface area with a stone slab. The use of dimples 54 is more efficient than modifying a surface of the stone slab itself to increase surface area, such as by forming grooves in a back surface of the stone slab. Forming grooves or texturing a hard stone slab can require more time and cost than adding dimples 54 to deformable or malleable interface layers 50a and 50b.

Dimples 54 can be formed on panel backers 46 by physical or chemical processes such as pressing, stamping, punching, spraying, blasting, etching, imaging, radiating, or other suitable process. In an embodiment, dimples 54 are formed on one or more panel backers 46 by applying pressure with a press or hydraulic press 56. Press 56 can include first and second opposing plates 58a and 58b, between which an object to be pressed is placed. A number or protrusion 60 are used together with press 56 form dimples 54. Dimples 54 are formed in interface layers 50a and 50b as a material of the interface layers is deformed by protrusions 60, which are made of a material that is harder or less malleable than the material in which dimples 54 are formed. A size, shape, number, and location of protrusions 60 can be a substantial mirror image of the size, shape, number, and location of dimples 54. Protrusions 60 can be formed on one or more plates 58a and 58b of press 56, or alternatively, can be formed on, or as part of, slipsheets or dimpling sheets 62.

Slipsheets 62 are panels or sheets that can be disposed between plates 58 of press 56 and panel backers 46. Slipsheets 62 generally include an area that is greater than or equal to an area of panel backers 46. Slipsheets 62 can be formed with dimples 54 on one or more surfaces of the slipsheets and can be used in conjunction with press 56 for forming dimples 54 in panel backers 46. Protrusions can be formed on slipsheets 62 instead of, or in addition to, forming protrusions on one or more plates 58a and 58b of press 56. When slipsheets 62 are formed with protrusions 60, the slipsheets can comprise a single dimpled surface and an opposing planar surface or two opposing dimpled surfaces.

As shown in FIG. 2, a plurality of panel backers 46 can be disposed between opposing plates 58a and 58b of press 56 and can be interleaved with a plurality of and slipsheets 62. Accordingly, slipsheets 62 can be alternately disposed between panel backers 46, such that, as a non-limiting example, a first slipsheet is placed between plate 58a and a first panel backer 46, a second slipsheet 62 is placed between first and second panel backers 46, and a third slipsheet 62 is disposed between the second panel backer 46 and plate 58b. Thus, while FIG. 2 illustrates an embodiment with three slipsheets 62 and two panel backers 46, any number of panel backers 46 and slipsheets 62 can be disposed in press 56 at a same time. For example, a single panel backer 46 without any slipsheets 62 can be disposed between plates 58a and 58b, wherein plates 58a and 58b comprise protrusions 60. As plates 58a and 58b of press 56 are brought together the spaces 66 between plates 58a and 58b, slipsheets 62, and panel backers 46 is removed such that protrusions 60 are pressed into panel backers 46 and dimples 54 are made in the panel backers.

Figure 3:
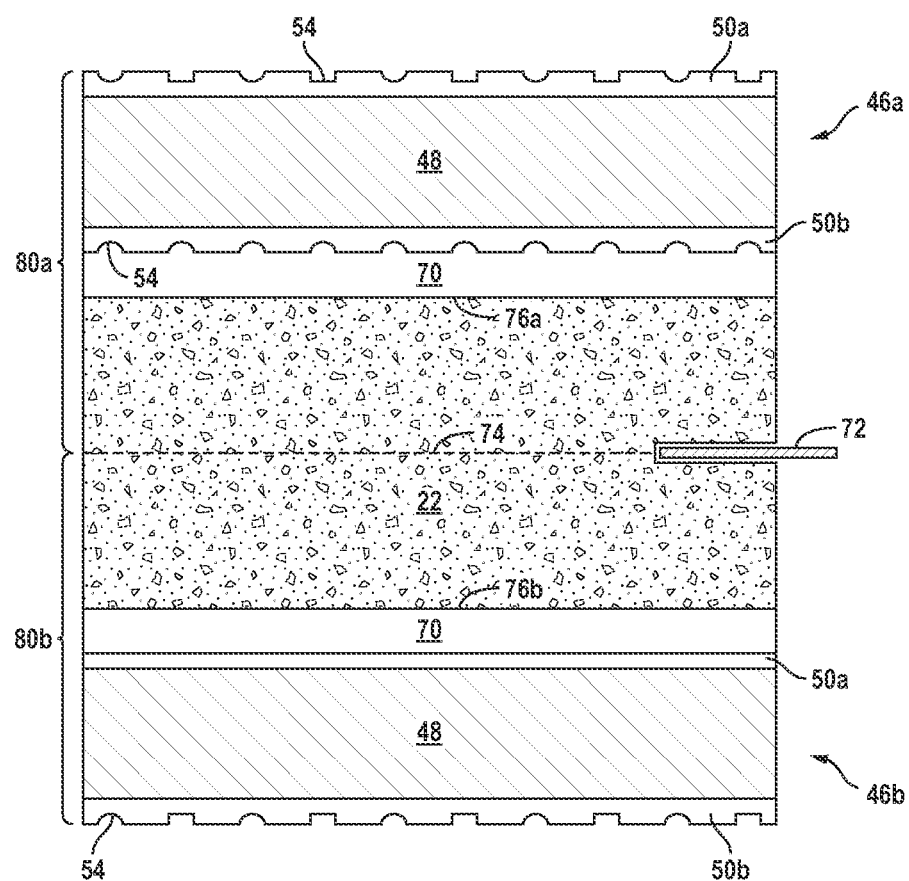
FIG. 3 illustrates a stone slab with panel backers disposed on opposing sides of the stone slab.

FIG. 3 shows a first panel backer 46a and a second panel backer 46b, similar to panel backers 46 shown in FIG. 2, attached to a stone slab 22 as discussed above with respect to FIGS. 1A and 1B. In an embodiment, a thickness of stone slab 22, that is a distance between opposing surfaces 76a and 76b of the stone slab 22, comprises greater than or equal to about 1.7 cm. Panel backers 46a and 46b are attached to stone slab 22 with adhesive or glue 70. A thickness of adhesive 70 can be in a range of 0.2 mm-1.5 mm. Adhesive 70 can be a one-stage or multi-stage adhesive that cures, dries, or chemically reacts to provide a permanent bond and physical connection between panel backers 46a and 46b, as well as stone slab 22. In an embodiment, adhesive 70 is an epoxy glue. FIG. 3 shows panel backers 46a and 46b attached with adhesive 70 to opposing sides of stone slab 22. Panel backers 46a and 46b can be attached to stone slab 22 at a same time or during a same processing step such that adhesive 70 is applied to, and cures or sets, on multiple and/or opposing surfaces of the stone slab at a same time. Alternatively, panel backers 46 can be attached to opposing sides of stone slab 22 at different times or during different processing steps.

When panel backers 46 are glued to stone slab 22, conditions of temperature, pressure, humidity, and time can be controlled to ensure a good bond between adhesive 70 and panel backers 46, as well as between adhesive 70 and stone slab 22. In an embodiment, adhesive 70 cures or dries while panel backers 46 and stone slab 22 are placed, under pressure, in a press similar to press 56 from FIG. 2. Panel backers 46 can be glued to stone slab 22 such that substantially an entirety of stone slab 22, or substantially an entirety of a surface 76a or 76b of stone slab 22, is covered by one or more panel backers. Alternatively, portions of stone slab 22 can remain exposed such that less than an entirety of surfaces 76a and 76b of stone slab 22 is covered by the one or more panel backers.

FIG. 3 further shows a saw blade or cutting tool 72 of a saw or splitting machine that is cutting stone slab 22 along segmentation line or projected cut line 74. Segmentation line 74 is disposed between outer surfaces 76a and 76b of stone slab 22. In an embodiment, segmentation line 74 can be disposed equidistantly between outer surfaces 76a and 76b, such that saw blade 72 cuts stone slab 22 into substantially equal thicknesses, for example, thicknesses in a range of approximately 0.2-1.5 cm, to form first and second composite stone panels 80a and 80b, respectively, comprising panel backers 46, adhesive 70, and stone slabs 22. Stone slab 22 can be gauged or calibrated to have a thickness in a range of 7.5-9.5 mm, and in some instances includes thickness of about 8.5 mm.

In an embodiment, stone slab 22 is cut along segmentation line 74 with saw blade 72, which can be configured as part of a vibrating bandsaw and can also comprise a circular or band-like shape. Saw blade 72 can further comprise and further comprising a cutting edge or serrations along an edge of the blade, and be similar in shape to a shape of blades used in bandsaws. Saw blade 72 can be made of one or more materials, such as metal with an abrasive cutting edge or diamond tipped serrations. Saw blade 72 can oscillate or be driven rotationally around one or more blade driving elements (similar to a belt being driven by gears, wheels, or cogs) such that the movement of saw blade 72 relative to stone slab 22 will cut or remove material from the slab along segmentation line 74 to form first and second composite stone panels 80a and 80b.

Stone slab 22 attached to panel backers 46 can be moved relative to saw blade 72 by being placed on a conveyor, splitting conveyor, or table that can include a number of belts or rollers that rotate to drive stone slab 22 through a cutting path of saw blade 72 along segmentation line 74. By maintaining a surface of the conveyor substantially parallel, and at a substantially fixed distance, with respect to saw blade 72, stone slab 22 is segmented to form first and second composite stone panels 80a and 80b. A cutting speed or a speed of how quickly saw blade 72 travels along segmentation line 74 is controlled by the relative movement of saw blade 72 and stone slab 22 in a direction of segmentation line 74. A desired cutting speed and blade thickness of saw blade 72 is determined by a size and hardness of stone slab 22 and by an amount of material being removed from the stone slab by saw blade 72. In an embodiment, the cutting speed of stone slab 22 is in a range of approximately 0.211 mm/sec-0.635 mm/sec. A thickness of saw blade 72 can be in a range of 0.75-2.0 mm. As such, stone slab 22 can be segmented to form first and second composite stone panels 80a and 80b by using blade 72, which can be thinner and more delicate than standard blades, such as blade 14, that are used for cutting stone blocks 10. By accounting for a thickness of saw blades 72, cutting speed, stone hardness, and stone size, overheating is avoided during the cutting of stone slab 22. Water can also be used during the cutting of slabs 22 to reduce a risk or likelihood of overheating.

As a width and length of stone panel 22 increases, a length of saw blade 72 can also increase to provide a liner cutting portion of the saw blade that is long enough to provide a planar cut across the stone panel and along segmentation line 74. As a length of saw blade 72 increases, a resonance of saw blade 72 also increases. In order to avoid excess resonance of saw blade 72, a thickness of the saw blade is also increased. However, as a thickness of saw blade 72 increases, a larger portion of stone is removed along segmentation line 74 during formation of first and second composite stone panels 80a and 80b, which adds to waste by reducing an amount of usable material within stone slab 22. Accordingly, a point of diminishing returns is reached in which additional thickness of saw blade 72 reduces less resonance while removing more material from stone slab 22. While a thickness of saw blade 72 varies with cutting speed, stone hardness, and stone size, a thickness of saw blade 72 is typically in a range of 1.0-2.0 mm, which is thicker than the blade thickness conventionally used for cutting smaller stone panels. By accounting for a thickness of saw blade 72, cutting speed, stone hardness, and stone size, overheating is avoided during the cutting of stone slab 22.

Exposed or sawn surfaces of portions of stone slab 22 of first and second composite stone panels 80a and 80b can be rough and non-planar after cutting. In applications in which smoother, more planar exposed surfaces are desired, a surface of stone slab 22 can be further planarized and smoothed, thereby forming stone panel 22 with a substantially smooth surface and a substantially uniform thickness. Exposed surfaces of stone slab 22 can be planarized by grinding, polishing, or other suitable process or combination of processes. In an embodiment, a composite stone panel 80 can be placed in a gauging machine to planarize the exposed stone surface. Different tolerances for a thickness and surface planarity of portions of stone slab 22 can be set depending on the final application or end use of the stone panel.

Figure 4:
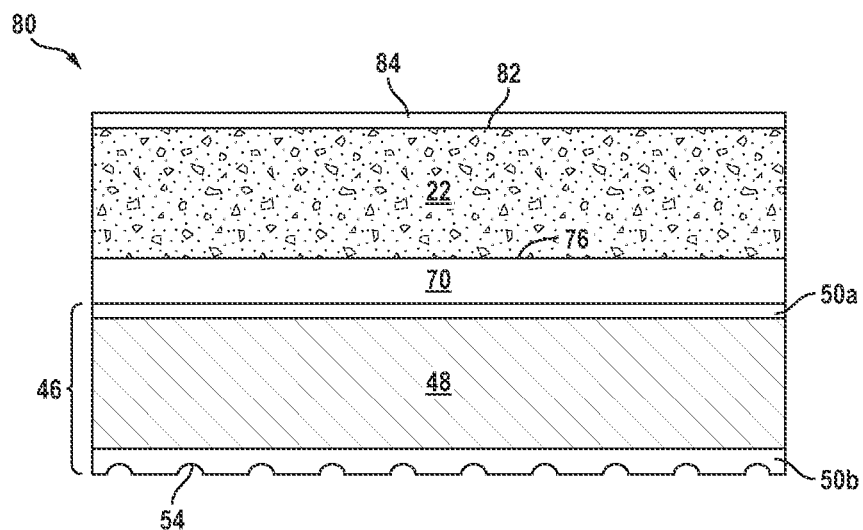
FIG. 4 illustrates an embodiment of a completed composite stone panel comprising a single panel backer.

FIG. 4 shows a cross-sectional view of a portion of a single composite stone panel 80 similar to panels 80a and 80b from FIG. 3. After separation of stone slab 22 along separation line 74, an exposed surface or face 82 of stone slab 22 is exposed opposite outer surface 76 and panel backer 46. Exposed surface 82 can be rough, uneven, and non-planar after cutting. In applications in which a smoother, more planar exposed surface 82 is desired, surface 82 of stone slab 22 can be planarized and smoothed, thereby forming stone slab 22 with a substantially uniform thickness. Exposed surface 82 can be planarized by grinding, polishing, or other suitable process. In an embodiment, composite stone panel 80 is placed in a gauging machine to planarize exposed surface 82. Different tolerances for thickness and surface planarity of stone slab 22, as well as composite stone panel 80, can be set depending on the final application or end use of the composite stone panel.

After cutting or planarizing exposed surface 82, a finish or sealant 84 can be applied to exposed surface 82. Many types of stone, and especially more porous types of stone, include naturally occurring holes, voids, and fissures, that can be filled with finish 84 to produce a more planar surface. In an embodiment, finish 84 includes a resin fill. By applying finish 84 to exposed surface 82, dust, dirt, water, contaminants, and other particles or substances can be prevented from undesirably discoloring, dirtying, or wearing stone slab 22. Depending on the nature and type of finish 84, the finish can undergo an optional drying or curing process. For example, a resin fill can be applied to stone slab 22 and then placed on a conveyor and sent through a drying oven to improve a bond between the resin fill and the stone slab. After finish 84 is cured or dried, stone slab 22 and finish 84 can undergo polishing, for example on a polishing machine.

By forming composite stone panel 80 with panel backer 46, composite stone panel 80 can be larger and stronger than previously made panels. As mentioned previously, a CTE of core material 48 can be in a range of about 20-200, while a CTE of stone slab 22 can be in a range of about 5-15, or about 10. A CTE mismatch or difference in CTEs between the stone slab 22 and the core material layer 48 means that during temperature cycling the differences in expansion and contraction will cause stress and strain to develop at an interface between stone slab 22 and core material layer 48. However, stresses developed from the CTE mismatch between stone slab 22 and core material layer 48 can be mitigated by interface layer 50a. When interface layer 50a comprises a metal such as aluminum, the interface layer can have a CTE in a range of about 20-30, or a CTE between the CTEs of stone slab 22 and core material layer 48, which reduces the CTE mismatch and the resulting strain. Additionally, strain generated by CTE mismatch is also born, at least in part, by interface layer 50. Because metal or aluminum interface layer 50a includes a tensile strength greater than a tensile strength of core material layer 48, an overall tensile strength of panel backer 46 and composite stone panel 80 is increased, which in turn allows for composite stone panel 80 to be made with stone slabs 22 of larger sizes.

The additional strength attained by composite stone panel 80 from panel backer 46 allows the composite stone panel to comprises a length greater than 2.4 m (or 8 ft.), a width greater than 1.5 m (or 4 ft.), and a thickness in a range of 0.6-3.0 cm. In an embodiment, composite stone panel 80 can comprise a size of about 1.55 m by 3.0 m (or 61 in. by 120 in.). By forming composite stone panels 80 with panel backers 46, robust composite stone panels can be made in sizes that are greater than what was previously attainable in the prior art with other backers, such as thinner backers. The larger size of composite stone panels 80 can provide for applications in which installation is simplified because fewer panels are needed to cover a similar area with stone. Using a smaller number of panels or a single panel to cover an area that would have previously been covered by multiple panels can also provide for a more aesthetic product by reducing a number of joints or seems between panels or stone pieces. Additionally, when used in a shower environment a single composite panel now can cover an entire 1.54 m wide tub surround area with no seams between panels, thereby creating a grout-less and seamless environment. Previously, a 1.54 m seamless surround area could not be provided when using stone composite panels.

Figure 5:
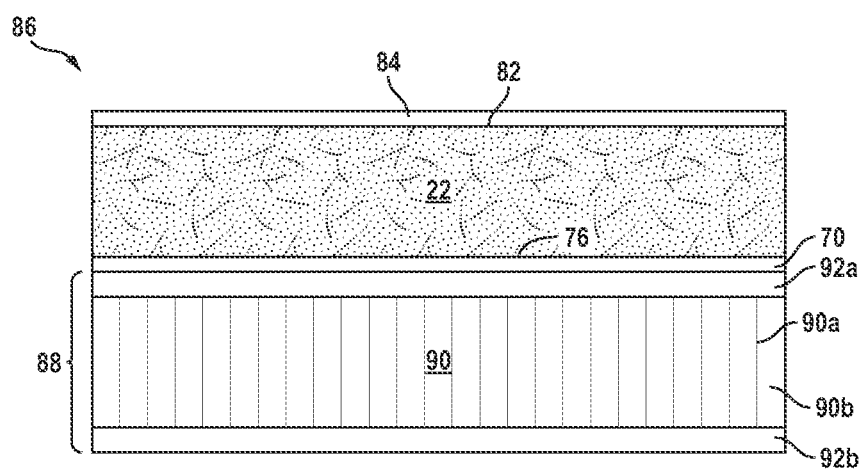
FIG. 5 illustrates an embodiment of a completed composite stone panel comprising a single panel backer.

FIG. 5 shows a cross-sectional view of a portion of a single composite stone panel 86 similar to panel 80 from FIG. 4. Panel 86 differs from panel 80 by the inclusion of panel backer 88 rather than panel backer 46. Panel backer 88 comprises core layer 90 and interface layers 92. Core layer 90 comprises structural members 90a that are alternately arranged with respect to, and separated by, spaces 90b. In an embodiment, core layer 90 is organized in a "honeycomb" configuration, although a footprint of structural members 90a and spaces 90b can be formed in any shape or pattern including, without limitation, circles, squares, polygons, lines, crosses, arrows, channels, and angles. Core layer 90 can be made of any suitable metal such as, without limitation, steel, iron, copper, aluminum, or alloys thereof. Core layer 90 can also be made of fiberglass, carbon fiber, plastic, metal, other suitable material, or combination of materials comprising a desirable strength, size to weight ratio, and CTE. In an embodiment, structural members 90a are aluminum. Core layer 90 can comprise a thickness in a range of 3.75 mm to 6.00 mm. Core layer 90 is disposed or "sandwiched" between non-metallic interface layers 92a and 92b such that a first surface of core layer 90 is coupled to or contacts interface layer 92a and a second surface of core layer 90 opposite the first surface is coupled to or contacts interface layer 92b.

Interface layers 92 are similar to interface layers 50 of panel backers 46. Interface layers 92 can be made of any suitable metal such as, without limitation, steel, iron, copper, aluminum, or alloys thereof. Interface layers 92 can also be made of made of a fiberglass, carbon fiber, plastic, other suitable material, or combination of materials comprising desirable strength, size to weight ratio, and CTE. In a particular non-limiting embodiment, when structural members 90a are aluminum, interface layers 92a and 92b comprise fiberglass layers. Interface layers 92a and 92b can include a thickness in a range of about 0.21-0.30 mm (or about 8-12 mils).

Panel backer 88 is formed by attaching or coupling core layer 90 to interface layers 92a and 92b with an adhesive or glue similar to adhesive 70. In an embodiment, the adhesive that attaches core layer 90 to interface layers 92 is an epoxy glue. Panel backers 88 can also be formed with optional dimples similar to dimples 54 to improve adhesion between the panel backer and the adhesive, as described above in relation to composite stone panel 80. Forming panel backer 88 comprising core layer 90 sandwiched between interface layers 92 provides advantages similar to those described above with respect to composite stone panel 80. For example, panel backer 88 increases an overall tensile strength of composite stone panel 86. Additionally, a size of composite stone panel 86 can be greater than a size of stone panels previously known in the art. As represented in FIG. 5, stone slab 22 can comprises a length greater than 1.2 m (or 4 ft.) and a width greater than 0.6 m (or 2 ft.) such that composite stone panel 86 comprises a thickness in a range of 0.6-3.0 cm (or 0.2-1.2 in.). Commonly, composite stone panel 86 can comprise a size of about 1.6 m by 2.4 m (or 60 in. by 96 in.).

Figure 6:
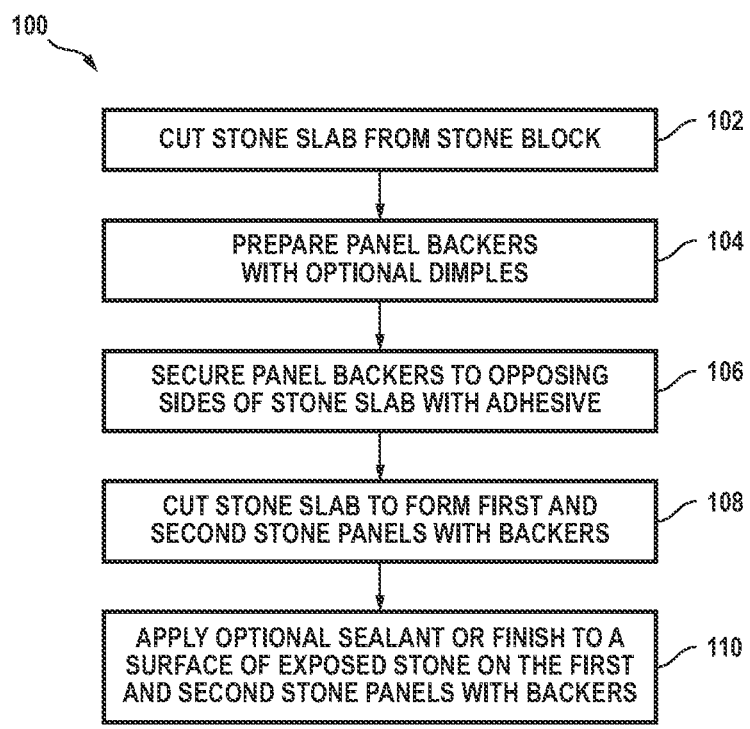
FIG. 6 illustrates a method of forming a composite stone panel.

FIG. 6, shows a number of steps for a method 100 of forming a composite stone panel comprising, cutting a stone slab from a stone block (step 102), preparing panel backers with optional dimples (step 104), securing panel backers to opposing sides of the stone slab with adhesive (step 106), cutting the stone of the stone slab to form first and second stone panels with backers (step 108), and applying an optional sealant or finish to a surface of exposed stone on the first and second stone panels with backers (step 110).

In the foregoing specification, various embodiments have been described. It will, however, be evident that various modifications and changes may be made thereto without departing from the broader spirit and scope set forth in the appended claims. The specification and drawings are, accordingly, to be regarded in an illustrative sense rather than a restrictive sense.

What is claimed is:

1. A method of making a composite stone panel, comprising:
   providing a stone slab comprising a length greater than 2.4 meters (m) and a width greater than 1.2 m and further comprising a first surface and a second surface opposite the first surface;
   coupling a first partially metallic panel backer to the first surface of the stone slab and coupling a second partially metallic panel backer to the second surface of the stone slab, the first and second partially metallic panel backers comprising:
      a core material layer comprising thermoplastic and further comprising a thickness in a range of 3.75-6 millimeters (mm),
      a first metallic interface layer comprising aluminum and a thickness in a range of 0.21-0.3 mm disposed on a first surface of the core material layer,
      a second metallic interface layer comprising aluminum and a thickness in a range of 0.21-0.3 mm disposed on a second surface of the core material layer opposite the first surface of the first core material layer, and
      wherein dimples are formed in the first metallic interface layer of the first partially metallic panel backer by placing the first partially metallic panel backer and a slipsheet within a press, and applying pressure with the press to the first partially metallic panel backer and the slipsheet to form the dimples in the first metallic interface layer of the first partially metallic panel backer, wherein the dimples increase a surface area of the first metallic interface layer of the first partially metallic panel backer by a factor of about two; and
   separating the stone slab between the first partially metallic panel backer and the second partially metallic panel backer to form:
      a first composite stone panel comprising a first portion of the stone slab coupled to the first partially metallic panel backer, the first composite stone panel comprising a length greater than 2.4 m and a width greater than 1.2 m, and
      a second composite stone panel comprising a second portion of the stone slab coupled to the second partially metallic panel backer, the second composite stone panel comprising a length greater than 2.4 m and a width greater than 1.2 m.

2. The method of claim 1, wherein separating the stone slab forms the first composite stone panel comprising a thickness in a range of 0.6-3.0 centimeters.

3. The method of claim 1, wherein first partially metallic panel backer comprises a thickness in a range of 4.17-6.6 mm.

4. The method of claim 1, wherein the core material layer comprises polyethylene.

5. The method of claim 1, further comprising applying a sealant to a surface of the first composite stone panel opposite the first partially metallic panel backer after separating the stone slab between the first partially metallic panel backer and the second partially metallic panel backer.

6. A method of making a composite stone panel, comprising:
   providing a stone slab comprising a length greater than 1.2 meters (m) and a width greater than 0.6 m, the stone slab further comprising a first surface and a second surface opposite the first surface;
   coupling a first panel backer to the first surface of the stone slab, the first panel backer comprising a first core layer comprising a thickness in a range of 3.75-6 millimeters (mm);
   coupling a second panel backer to the second surface of the stone slab, the second panel backer comprising a second core layer comprising a thickness in a range of 3.75-6 mm; and
   cutting the stone slab between the first panel backer and the second panel backer to form:
      a first composite stone panel comprising a first portion of the stone slab coupled to the first panel backer, the first composite stone panel comprising a length greater than 1.2 m and a width greater than 0.6 m,
      a second composite stone panel comprising a second portion of the stone slab coupled to the second panel backer, the second composite stone panel comprising a length greater than 1.2 m and a width greater than 0.6 m, and
      wherein dimples are formed in the first panel backer before cutting the stone slab between the first panel backer and the second panel backer by placing a slipsheet and the first panel backer coupled to the stone slab within a press, and applying pressure with the press to the first panel backer and the slipsheet to form the dimples in the first panel backer, wherein the dimples increase a surface area of the first panel backer by a factor of about two.

7. The method of claim 6, further comprising applying a sealant to a surface of the a first portion of the stone slab opposite the first panel backer after cutting the stone slab between the first panel backer and the second panel backer.

8. The method of claim 6, wherein:
   the first panel backer further comprises:
      a first metallic interface layer comprising a thickness in a range of 0.21-0.30 mm disposed on a first surface of the first core material layer, and
      a second metallic layer comprising a thickness in a range of 0.21-0.30 mm disposed on a second surface of the first core material layer opposite the first surface of the core material layer; and
   the second panel backer further comprises:
      a first metallic interface layer comprising a thickness in a range of 0.21-0.30 mm disposed on a first surface of the second core material layer, and
      a second metallic interface comprising a thickness in a range of 0.21-0.30 mm layer disposed on a second surface of the second core material layer opposite the first surface of the second core material layer.

9. The method of claim 8, wherein the first and second interface layers of the first and second panel backers comprise aluminum or aluminum alloy.

10. The method of claim 6, wherein the first core material layer comprises polyethylene.

11. The method of claim 6, wherein the first panel backer and second panel backer are coupled to the stone slab with a thickness of epoxy adhesive in a range of 0.2-1.5 mm.

12. A method of making a composite stone panel, comprising:
provproviding a stone slab comprising a length greater than 2.4 meters (m), a width greater than 1.2 m, and a thickness in a range of 0.2-1.5 centimeters (cm), the stone slab further comprising a first surface and a second surface opposite the first surface;
coupling a first panel backer to the first surface of the stone slab, the first panel backer comprising a thickness in a range of 4.17-6.6 millimeters (mm);
coupling a second panel backer to the second surface of the stone slab, the second panel backer comprising a thickness in a range of 4.17-6.6 mm; and
cutting the stone slab between the first panel backer and the second panel backer to form:
a first composite stone panel comprising a first portion of the stone slab coupled to the first panel backer, the first composite stone panel comprising a length greater than 2.4 m and a width greater than 1.2 m,
a second composite stone panel comprising a second portion of the stone slab coupled to the second panel backer, the second composite stone panel comprising a length greater than 2.4 m and a width greater than 1.2 m, and
wherein dimples are formed in the first panel backer before cutting the stone slab between the first panel backer and the second panel backer by placing a slipsheet and the first panel backer coupled to the stone slab within a press, and applying pressure with the press to the first panel backer and the slipsheet to form the dimples in the first panel backer, wherein the dimples increase a surface area of the first panel backer by a factor of about two.

13. The method of claim 12, further comprising applying a sealant to a surface of the first composite stone panel opposite the first panel backer after cutting the stone slab between the first panel backer and the second panel backer.

14. The method of claim 12, wherein:
the first panel backer further comprises:
a first core material layer comprising a thermoplastic comprising a thickness in a range of 3.75-6.0 mm,
a first metallic interface layer disposed on a first surface of the first core material layer, the first metallic interface layer comprising a thickness in a range of 0.21-0.3 mm, and
a second metallic layer disposed on a second surface of the first core material layer opposite the first surface of the first core material layer, the second metallic interface layer comprising a thickness in a range of 0.21-0.3 mm; and
the second panel backer further comprises:
a second core material layer comprising a thermoplastic comprising a thickness in a range of 3.75-6.0 mm,
a first metallic interface layer disposed on a first surface of the second core material layer, the first metallic interface layer comprising a thickness in a range of 0.21-0.3 mm, and
a second metallic interface layer disposed on a second surface of the second core material layer opposite the first surface of the second core material layer, the second metallic interface layer comprising a thickness in a range of 0.21-0.3 mm.

15. The method of claim 14, wherein the first core material layer and the second core material layer comprise polyethylene.

16. The method of claim 14, further comprising:
forming the first and second metallic interface layers comprising a coefficient of thermal expansion in a range of 20-30; and
forming the first and second core material layers comprising a coefficient of thermal expansion in a range of 20-200.

* * * * *